(12) United States Patent
Golla et al.

(10) Patent No.: US 9,068,442 B2
(45) Date of Patent: Jun. 30, 2015

(54) DETERMINING THE ORDER OF DEVICES IN A DOWNHOLE STRING

(75) Inventors: Christopher Golla, Kingwood, TX (US); Laban Marsh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 846 days.

(21) Appl. No.: 13/265,975

(22) PCT Filed: May 13, 2010

(86) PCT No.: PCT/US2010/034637
§ 371 (c)(1),
(2), (4) Date: Oct. 24, 2011

(87) PCT Pub. No.: WO2011/142755
PCT Pub. Date: Nov. 17, 2011

(65) Prior Publication Data
US 2012/0170409 A1    Jul. 5, 2012

(51) Int. Cl.
*E21B 47/16* (2006.01)
*E21B 47/12* (2012.01)
*H04L 12/10* (2006.01)

(52) U.S. Cl.
CPC .............. *E21B 47/12* (2013.01); *H04L 12/10* (2013.01)

(58) Field of Classification Search
CPC ........................................................ E21B 47/16
USPC ..................................................... 367/81, 82
See application file for complete search history.

(56) References Cited

U.S. PATENT DOCUMENTS

| 4,241,305 | A | * | 12/1980 | Dickerson ...................... 324/532 |
| 5,247,464 | A | * | 9/1993 | Curtis ............................. 379/25 |
| 5,485,089 | A | * | 1/1996 | Kuckes ......................... 324/346 |
| 6,166,653 | A | * | 12/2000 | Schulmeyer et al. ........ 340/9.16 |
| 6,392,558 | B1 | | 5/2002 | Schulmeyer et al. |
| 6,590,755 | B1 | | 7/2003 | Behr et al. |
| 6,769,078 | B2 | | 7/2004 | Barenys et al. |
| 6,834,529 | B2 | | 12/2004 | Head |
| 6,938,506 | B2 | | 9/2005 | Henry et al. |
| 6,976,535 | B2 | | 12/2005 | Aronstam et al. |
| 6,995,677 | B2 | | 2/2006 | Aronstam et al. |
| 7,444,208 | B2 | | 10/2008 | Kadoi et al. |

(Continued)

OTHER PUBLICATIONS

"International Search Report and Written Opinion of the International Searching Authority", PCT/US10/34637, (Jul. 14, 2010).

*Primary Examiner* — Amine Benlagsir
(74) *Attorney, Agent, or Firm* — Howard L. Speight, PLLC

(57) ABSTRACT

A string of subs includes a controller sub. The controller sub includes a first end, a second end, a controller, a first controller bus coupled to the controller, the first controller bus exiting at the first end of the controller sub, and a second controller bus coupled to the controller, the second controller bus being separate from the first controller bus, the second controller bus exiting at the second end of the controller sub. The string of subs also includes a first measuring sub and a second measuring sub. A process, running on a computer, discovers that the first measuring sub is connected to the first controller bus, discovers that the second measuring sub is connected to the first controller bus, determines that the first measuring sub is physically closer to the controller sub than the second measuring sub, and use the fact that the first measuring sub is physically closer to the controller sub than the second measuring sub in controlling the operation of the string of subs.

23 Claims, 6 Drawing Sheets

(56) References Cited

U.S. PATENT DOCUMENTS

| | | |
|---|---|---|
| 7,613,124 B2 | 11/2009 | Caveney |
| 7,679,368 B2 | 3/2010 | Folberth |
| 7,982,464 B2* | 7/2011 | Bittar et al. ................. 324/339 |
| 8,316,936 B2* | 11/2012 | Roddy et al. ............... 166/253.1 |
| 2003/0085715 A1* | 5/2003 | Lubkeman et al. ........... 324/509 |
| 2003/0177851 A1* | 9/2003 | Henry et al. ................ 73/866.5 |
| 2004/0002792 A1* | 1/2004 | Hoffknecht .................. 700/295 |
| 2004/0182132 A1* | 9/2004 | Head .............................. 73/23.2 |
| 2004/0211272 A1* | 10/2004 | Aronstam et al. ........... 73/866.5 |
| 2005/0011645 A1* | 1/2005 | Aronstam et al. ....... 166/250.11 |
| 2007/0029083 A1* | 2/2007 | Folberth .................... 166/254.2 |
| 2007/0061050 A1* | 3/2007 | Hoffknecht ................... 700/291 |
| 2009/0262074 A1* | 10/2009 | Nasiri et al. .................. 345/158 |
| 2009/0279437 A1* | 11/2009 | Ransom et al. ............... 370/238 |
| 2011/0100712 A1* | 5/2011 | Poedjono ....................... 175/45 |
| 2012/0139748 A1* | 6/2012 | Hay et al. ................... 340/854.1 |

* cited by examiner

DETERMINING THE ORDER OF DEVICES IN A DOWNHOLE STRING

BACKGROUND

Collections of downhole tools and other devices are sometimes assembled into a string and attached to, for example, drill pipe or a wireline for insertion into a borehole. It can be useful, although challenging, to automatically determine the order of those downhole tools and other devices before or after they have been inserted into the borehole.

DETAILED DESCRIPTION

Figure 1:
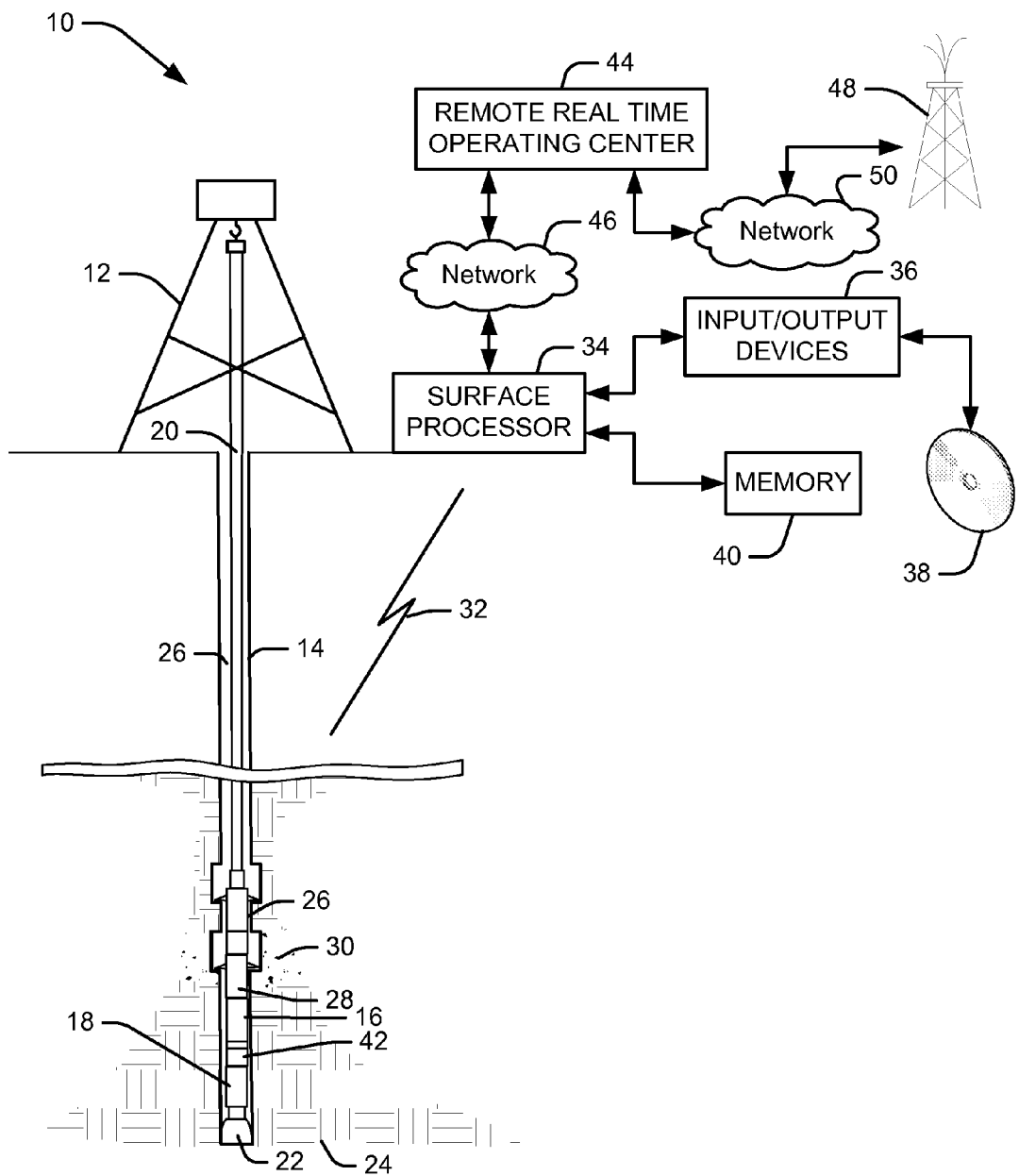
FIG. 1 is an illustration of a drilling system.

In one embodiment of a drilling system 10, illustrated in FIG. 1, a drilling rig 12 is disposed on the surface of the earth atop a borehole 14. In one embodiment, a logging tool 16 is carried by a sub 18, typically a drill collar, incorporated into a drill string 20 and disposed within the borehole 14. In one embodiment, a drill bit 22 is located at the lower end of the drill string 20 and carves a borehole 14 through the earth formations 24. The drill bit 22 may be one or more bits. In one embodiment, one or more secondary cutting structures 26, 28 increase the size of the borehole 14 in selected intervals. In one embodiment, the secondary cutting structures 26, 28 include reamers, such as the Near Bit Reamer or the Under-Reamer available from Halliburton. In the example shown in FIG. 1, the rock 30 that secondary cutting structure 28 is cutting through may have different properties than those of the rock that the bit 22 is cutting through. The properties of the rock 30 may be known in advance of the secondary cutting structures 26, 28 arriving at the rock 30 because the bit 22 has already cut through rock 30. The properties of the rock ahead of the bit 22 are known only to the extent that the rock has been encountered in other wells and the location of the rock boundary has been correctly predicted.

The logging tool 16 can be one or more of any conventional logging instrument such as acoustic (sometimes referred to as sonic), neutron, gamma ray, density, photoelectric, nuclear magnetic resonance, or any other conventional logging instrument, or combinations thereof, which can be used to determine the lithology and or the porosity of formations surrounding an earth borehole.

Because the logging tool 16 is embodied in the drill string 20 in FIG. 1, the system is considered to be a measurement while drilling (MWD) or logging while drilling (LWD) system, i.e., it logs while the drilling process is underway. In one embodiment, the logging data can be stored in a conventional downhole recorder (not illustrated), which can be accessed at the earth's surface when the drill sting 20 is retrieved. In one embodiment the logging data can be transmitted to the earth's surface using telemetry, as illustrated by lightning bolt 32, such as the conventional mud pulse telemetry systems. In one embodiment, the logging data from the logging tool 16 reaches a surface processor 34 that processes data. In one embodiment, the downhole equipment, including the logging tool 16, is powered by a battery or generator co-located with the downhole equipment. In one embodiment, the downhole equipment is powered from the surface through, for example, wired drilling pipe.

In addition to LWD instrumentation, wireline logging instrumentation may also be used. That is, in one embodiment, wireline logging instrumentation may also be used for logging the formations surrounding the borehole as a function of depth. With wireline instrumentation, a wireline truck (not shown) is typically situated at the surface of a well bore. A wireline logging instrument is suspended in the borehole by a logging cable which passes over a pulley and a depth measurement sleeve. As the logging instrument traverses the borehole, it logs the formations surrounding the borehole as a function of depth. The logging data is transmitted through a logging cable to a processor located at or near the logging truck to process the logging data as appropriate for use with the embodiments of the present disclosure. As with the MWD embodiment of FIG. 1, the wireline instrumentation may include any conventional logging instrumentation which can be used to determine the lithology and/or porosity of formations surrounding an earth borehole, for example, such as acoustic, neutron, gamma ray, density, photoelectric, nuclear magnetic resonance, or any other conventional logging instrument, or combinations thereof, which can be used to determine lithology.

In one embodiment, surface processor 34 includes at least one port for receiving input information and/or commands and/or for transmitting output information and/or commands, for instance, from any suitable input/output device (or devices) 36. Input device (devices) may include a keyboard, keypad, pointing device, or the like, further including a network interface or other communications interface for receiving input information from a remote computer or database and a media reading and/or writing device for reading and/or writing media, such as optical media 38. Output devices may include a display device for use in generating a display of information contained in the output signals, a printer device for use in generating a printout of information contained in the output signals, and/or any other similar devices.

In one embodiment, the surface processor 34 has access to memory. In one embodiment, the surface processor 34 has access to internal memory, such as random access memory ("RAM"). In one embodiment, the surface processor has access to external memory 40, such as an external hard drive or an external flash drive. In one embodiment, the memory is used to store programs for the surface processor to execute to perform the processes described herein and to perform other processes. In one embodiment, the memory is used as short-term storage for computations performed in the processes described herein and to perform other processes.

In one embodiment, the string of tools and other equipment just above the bit 22 (where "above" and other similar words refer to the direction along the drilling string 20 toward the drilling rig 12; "below" and other similar words refer to the opposite direction along the drilling string 20) is known as the bottom hole assembly ("BHA"). In one embodiment, the BHA includes a controller sub 42 that includes equipment to control the operations of some or all of the equipment in the BHA. In one embodiment, the controller sub 42 is itself controlled by the surface processor 34.

In one embodiment, the surface processor 34 communicates with a remote real time operating center ("RRTOC") 44 by way of a network 46. Through this communication, in one embodiment, the surface processor 34 communicates data regarding the operation of the drilling system 10. In one embodiment, the RRTOC uses these communications to keep operators, managers, customers, and other interested parties (not shown) informed about the progress of the well being developed. In one embodiment, these communications allow the drilling operation, including the operation of the equipment in the BHA, to be controlled remotely. In one embodiment, the RRTOC applies the information it receives from drilling system 10 to influence the drilling of other wells, e.g. well 48, with which it communicates by way of network 50. In one embodiment, network 50 is the same network as network 46. In one embodiment, network 50 is a different network from network 46.

In one embodiment, the surface processor 34, the controller 42, or the RRTOC 44, or another computer executes a computer program to control the drilling operation. For example, one such computer program generates a geology characteristic of the formation per unit depth according to a prescribed geology model and outputting signals representative of the geology characteristic, the geology characteristic including at least rock strength. In one embodiment, the computer program also includes instructions for obtaining specifications of proposed drilling equipment for use in the drilling of the well bore, the specifications including at least a bit specification of a recommended drill bit and the specification of one or more recommended secondary cutting structures. Lastly, in one embodiment, the computer program includes instructions for determining a predicted drilling mechanics in response to the specifications of the proposed drilling equipment as a function of the geology characteristic per unit depth according to a prescribed drilling mechanics model and outputting signals representative of the predicted drilling mechanics, the predicted drilling mechanics including at least one of the following selected from the group consisting of bit wear, mechanical efficiency, power, and operating parameters. In one embodiment, the programming of the computer program may further be accomplished using known programming techniques for implementing the embodiments as described and discussed herein. Thus, a geology of the given formation per unit depth can be generated, and in addition a predicted drilling mechanics performance of a drilling system may be determined. Still further, the drilling operation can be advantageously optimized in conjunction with a knowledge of a predicted performance thereof, as discussed further herein below. In one embodiment, such as that illustrated in FIG. 1, the weight-on-bit ("WOB") on the bit 22 and the two secondary cutting structures 26, 28 is used by the computer program to make drilling decisions. In one embodiment, it is useful to be able to distinguish the WOB on the secondary cutting structure 26 from the WOB on the secondary cutting structure 28.

Figure 2:
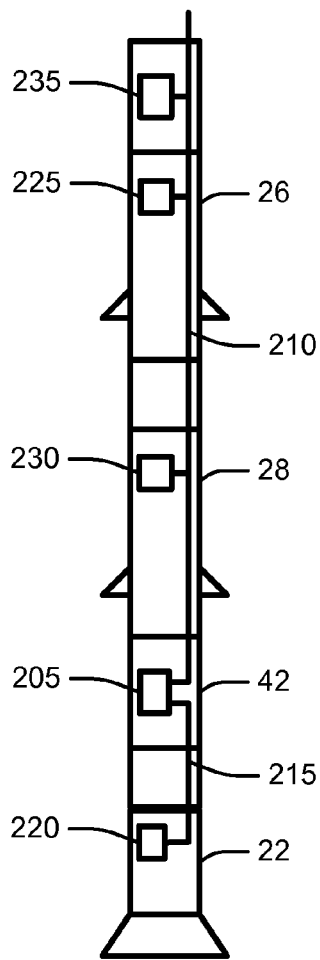
FIGS. 2-4 are illustrations of bottom hole assemblies.
Figure 3:
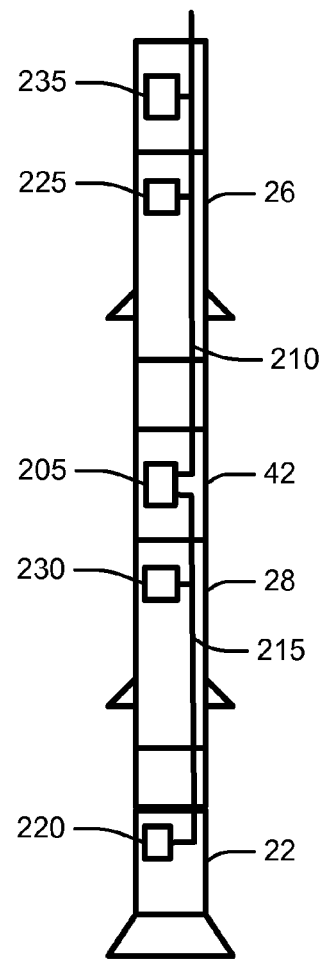
Figure 4:
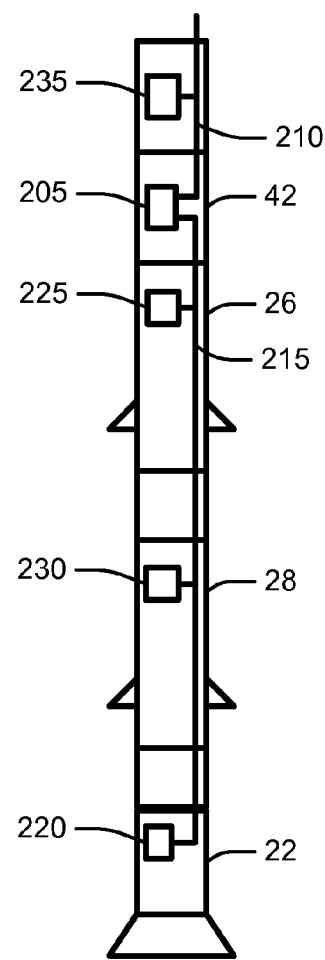

In one embodiment, the order of devices making weight-on-bit measurements in a BHA with a controller, a bit 22, and two secondary cutting structures 26, 28, has three variations, as shown in FIGS. 2, 3, and 4. Note that for simplicity, other devices in the BHA are not shown in FIGS. 2-4. In all variations, the bit 22 is at the bottom of the BHA. In one embodiment, shown in FIG. 2, the secondary cutting structure 26 and the secondary cutting structure 28 are above the controller sub 42. In one embodiment, shown in FIG. 3, the secondary cutting structure 26 is above controller sub 42 and the secondary cutting structure 28 is below the controller sub 42. In one embodiment, shown in FIG. 4, the secondary cutting structure 26 and the secondary cutting structure 28 are below the controller sub 42.

In one embodiment, the controller sub 42 includes a controller 205 and two busses—an upper bus 210 and a lower bus 215—that it uses to communicate with equipment in the BHA. The "upper" and "lower" designations were originally intended to refer to the direction the busses were directed in the BHA, with the lower bus being directed toward the bit 22 and the upper bus being directed toward the drilling rig 12 on the surface, but those descriptions are not necessarily accurate because the sub containing the controller (the "controller sub") may be installed in either orientation (i.e., box end up or box end down) depending on the needs of the field personnel.

In one embodiment, bit 22 includes a WOB measuring device 220 that measures the weight on the bit 22, secondary cutting structure 26 includes a WOB measuring device 225 that measures the weight on the secondary cutting structure 26, and secondary cutting structure 28 includes a WOB measuring device 230 that measures the weight on the secondary cutting structure 28.

In the embodiments shown in FIG. 2-4, the WOB measuring device 220 for the bit is coupled to the lower bus 215. In the embodiment shown in FIG. 2, the WOB measuring devices 225 and 230 for both second secondary cutting devices 26, 28 are coupled to the upper bus 210. In the embodiment shown in FIG. 3, the WOB measuring device 225 for secondary cutting device 26 is coupled to the upper bus 210 and the WOB measuring device 230 for the secondary cutting device 28 is coupled to the lower bus 215. In the embodiment shown in FIG. 4, the WOB measuring devices 225 and 230 for both second secondary cutting devices 26, 28 are coupled to the lower bus 215.

As part of its initialization procedure, the controller sub performs a "discovery" process to discover the devices that are present on the upper bus and the lower bus. It does this by transmitting a "who's there" message on each of the busses. Each of the devices on each bus responds with identifying information in its own time slot, determined, for example, by applying an algorithm to the device's serial or device number.

In one embodiment, the same software (or firmware) is used in all WOB measuring devices, including the software to respond to the controller. Thus, in one embodiment, the WOB device 220 associated with the bit 22, the WOB measuring device 225 associated with the secondary cutting structure 26, and the WOB measuring device 230 associated with the secondary cutting structure 28 provide the same identifying information in response to the controller's "who's there" message.

In one embodiment, it may not be possible to determine the origin of the WOB responses without further information. That is, because it is not known whether the upper bus 210 is directed in the upper direction or the lower direction, which bus transports a WOB response does not determine which device originated the response. For example, without additional information, the configurations in FIGS. 2 and 3 are logically identical—that is, in each configuration, one bus carries responses from two WOB measuring devices and the other bus carries responses from one WOB measuring device. In the configuration shown in FIG. 4, one bus carries responses from all three WOB measuring devices in the system. In one embodiment, it is difficult to distinguish these responses without additional information.

Figure 5:
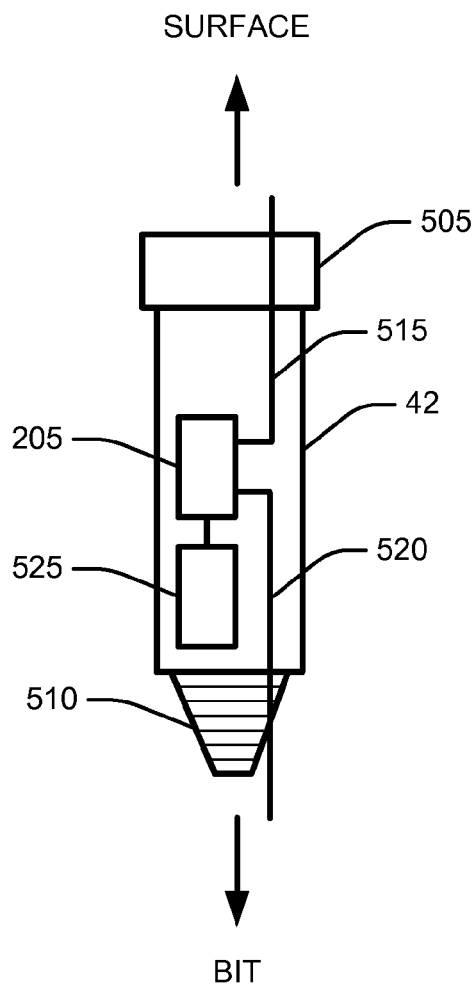
FIGS. 5 and 6 are illustrations of two possible orientations for a controller sub.
Figure 6:
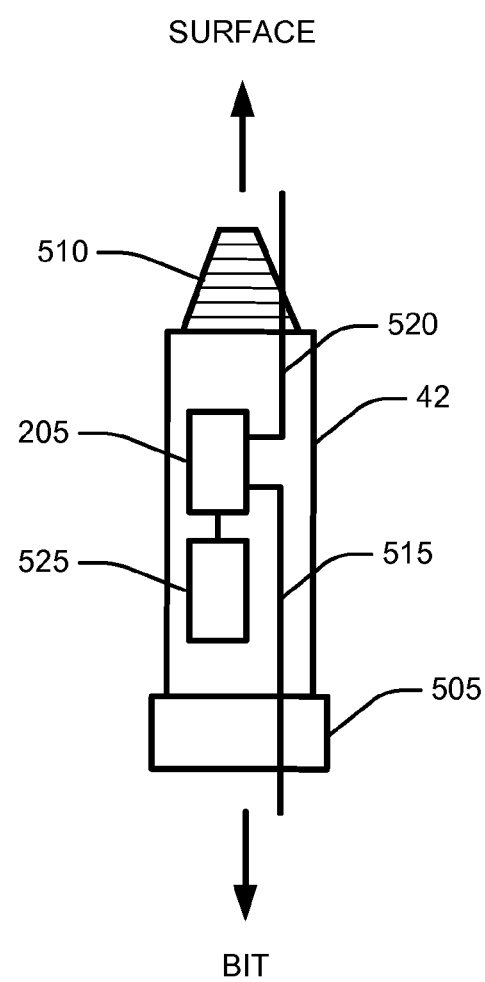

This ambiguity could be resolved by enforcing a particular controller sub orientation on field personnel assembling BHAs. It has been found, however, that flexibility in this regard is important in the field. Thus, in one embodiment, the controller sub 42 is installed in a BHA as shown in FIG. 5, with the box 505 being directed upward and the pin 510 being directed downward. In one embodiment, the controller sub 42 is installed in a BHA as shown in FIG. 6, with the box 505 being directed downward and the pin 510 being directed upward. In the configuration shown in FIG. 5, the bus 515 exiting the box is directed in the upward direction, while in FIG. 6 that same bus is directed in the downward direction. In the configuration shown in FIG. 5, the bus 520 exiting the pin is directed in the downward direction, while in FIG. 6 that same bus is directed in the upward direction. Further, in one embodiment, the controller sub has boxes on both ends. In still another embodiment, the controller sub has pins on both ends. These two cases emphasize the need for flexibility in the field.

The direction the busses are directed can be found by determining the direction the controller sub 42 is rotating. A rotation direction detection module 525, such as a magnetometer and software, firmware or hardware to interpret the magnetometer output as rotation, is included in the controller sub 42 for this purpose. Once the direction of rotation of the controller sub is known relative to the direction of rotation of the drill string, it is possible to infer the orientation of the controller sub and which bus is connected to devices above the controller sub and which bus is connected to devices below the sub. For example, it may be assumed that if the controller sub illustrated in FIG. 5 is installed in the BHA pin down that the rotation of the controller sub as indicated by the rotation direction detection module 525 (after correction for the sometimes serpentine path that a borehole will follow) will be in the same direction as the rotation of the drill string. If measurements show that to be the case, then it can be inferred that that the controller sub is installed pin down. If, on the other hand, measurements indicate that the controller sub is rotating in the opposite direction as the drill string, it may be inferred that the controller sub was installed pin up.

It is also possible determine the direction of the two busses based on the devices that are connected to each bus. For example, in one embodiment it is standard for the pulser 235 to be at the top of the BHA (i.e., most remote from the bit). Therefore, the bus that is connected to the pulser can be identified as the bus that is attached to devices above the controller sub in the BHA. Similarly, the bus that is not attached to the pulser can be identified as the bus that is attached to the bit 22. This would help resolve the ambiguity in the situations shown in FIGS. 2 and 3 because it could be inferred that the bus 215 is coupled to the bit. That information would not resolve the ambiguity between the two secondary cutting structures 26, 28 in the configuration shown in FIG. 2 and the ambiguity between the bit 22 and the secondary cutting structure 28 in FIG. 3. The pulser 235 connection information would not help resolve the situation in FIG. 4 in which the bit 22 and both secondary cutting structures are coupled to the same bus 215.

One embodiment for a technique to resolve this ambiguity recognizes that the WOB devices will be connected at different distances along the bus from the controller. In one embodiment, the technique measures a property that varies with distance from the bus controller and uses those measurements to determine the order of devices on the bus.

In one embodiment, the technique performs the following sequence of actions:
  A. Determine which bus is directed upward and which is directed downward by rotation or another method;
  B. Discover the devices on each bus;
  C. If two or more WOB devices (or other devices that cannot be distinguished by their communications responses) are on the same bus, determine the order of the two or more devices.

Determine Bus Directions

In one embodiment, determining which bus is directed upward and which is directed downward is accomplished using one or more of the techniques described above: (1) by observing which bus is coupled to a pulser; and/or (2) by rotating the drill string and observing the rotation of the controller sub 42 and comparing it to the rotation of the drill string 20.

Discovery Devices on Each Bus

In one embodiment, discovering the devices on each bus can be accomplished as described above. That is, in one embodiment, the controller 205 issues a "who's there" message on each of the busses 515, 520. In one embodiment, the devices on each of the busses respond at a unique time determined, for example, by their serial numbers or some other number that is unique to each device. In one embodiment, the controller 205 compiles the responses to create a list of devices coupled to each bus.

Determining the Order of Devices on a Bus by Measuring Current

Figure 7:
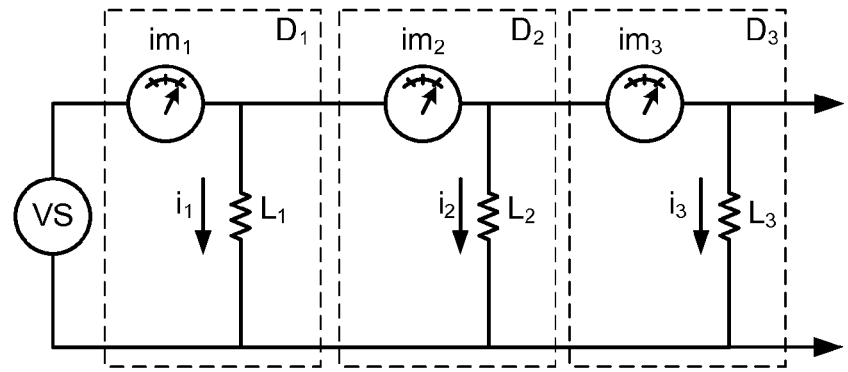
FIGS. 7-10 illustrate techniques for determining the order of devices along a bus.

In one embodiment, illustrated in FIG. 7, the BHA consists of three devices, D1, D2, and D3 consisting of three loads L1, L2, and L3, respectively (note that while the loads are shown as resistors they can be any kind of load, including inductive, capacitive, or any combination). In one embodiment, each device includes a current measuring device, such as device for directly measuring current or a device for measuring the electrical field created by the current. In one embodiment, device D1 includes current measuring device im1, device D2 includes current measuring device im2, and device D1 includes current measuring device im3. In one embodiment, one or more of the current measuring devices is a separate device and is not part of its respective device D1, D2, or D3. In one embodiment, current measuring device im1 measures the sum of the current i1 flowing through load L1, the current i2 flowing through the load L2, and the current i3 flowing through the load L3. In one embodiment, current measuring device im2 measures the sum of the current i2 flowing through the load L2 and the current i3 flowing through the load L3. In one embodiment, current measuring device im3 measures the current i3 flowing through the load L3. $i1+i2+i3>i2+i3>i3$. Consequently, in one embodiment, the amount of current measured by the current measurement device in each device can be ordered and the order will be the same as the order of devices along the bus.

Determining the Order of Devices on a Bus by Measuring Voltage

Figure 8:
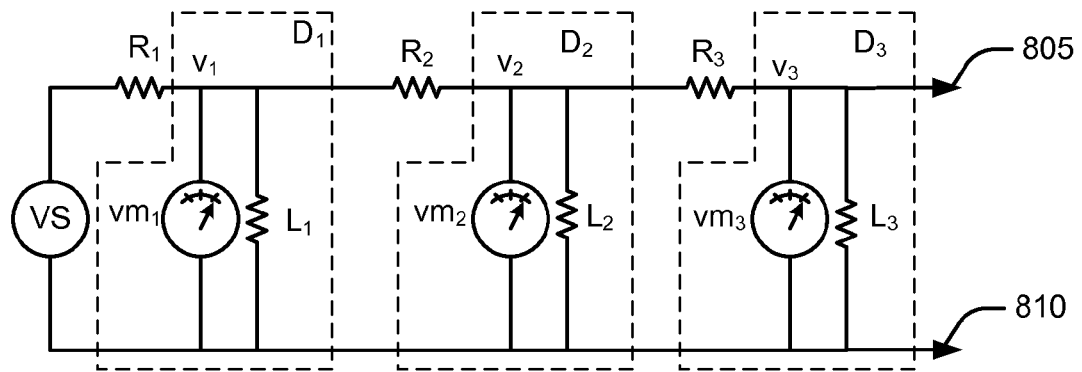

In one embodiment, illustrated in FIG. 8, the BHA consists of three devices, D1, D2, and D3 consisting of three loads L1, L2, and L3, respectively (note that while the loads are shown as resistors they can be any kind of load, including inductive, capacitive, or any combination). In one embodiment, each device consists of a voltage measuring device connected as shown. In one embodiment, device D1 includes voltage measuring device vm1 which measures the voltage across load L1. In one embodiment, device D2 includes voltage measuring device vm2 which measures the voltage across load L2. In one embodiment, device D3 includes voltage measuring device vm3 which measures the voltage across load L3. In one embodiment, one or more of the voltage measuring devices is a separate device and is not part of its respective device D1, D2, or D3. Resistors R1, R2, and R3 represent the small, but non-trivial, resistance (or, more generally, the impedance) of the cable and other elements (such as connectors, etc.) between the devices. Resistor R1 represents the resistance between the source VS and device D1. Resistor R2 represents the resistance between the device D1 and the device D2. Resistor R3 represents the resistance between the device D2 and the device D3. In one embodiment, Resistors R1, R2, and R3 will each have a small voltage drop so that the voltage measure by voltage measuring devices vm1 (i.e., voltage v1), vm2 (i.e., voltage v2), and vm3 (i.e., voltage v3)

will be progressively smaller; that is, the voltage measured by vm1 will be greater than the voltage measured by vm2, which will be greater than the voltage measured by vm3. Thus, those voltage measurements can be used to order the devices in the BHA.

In one embodiment, the bus is left open loop, as illustrated in FIG. 8. That is, in one embodiment, the termination of the bus, shown in FIG. 8 by points 805 and 810, is left open, instead of being shorted to make measurements as described in U.S. Pat. No. 6,166,653 to Schulmeyer, et al. Further, in one embodiment, the voltages v1, v2, and v3, are compared directly without first adjusting them for bias, such as is described in Schulmeyer, et al.

Determining the Order of Devices on a Bus Using Switches

Figure 9:
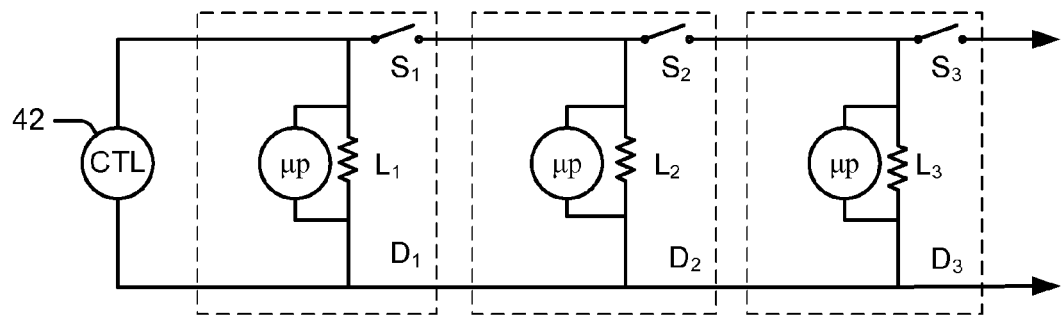

In one embodiment, illustrated in FIG. 9, the BHA consists of three devices, D1, D2, and D3 of three loads L1, L2, and L3, respectively (note that while the loads are shown as resistors they can be any kind of load, including inductive, capacitive, or any combination). In one embodiment, each device also includes a switch that can be used to open the bus to (or, alternatively, remove power from) devices further along the power bus. Device D1 includes switch S1, device D2 includes switch S2, and device D1 includes switch S3. In one embodiment, at least one of the switches S1, S2 and S3 is located as shown in FIG. 9, but is part of a separate device. Opening switch S1 will open the bus to devices D2 and D3. Opening switch S2 will open the bus to device D3.

Thus, in one embodiment, by opening and closing switches S1, S2, and S3, the order of the devices in the BHA can be ascertained. For example, in one embodiment, the controller 42 opens switch S1 which disconnects the bus to D2 and D3. The controller 42 attempts to communicate with the microprocessors ("µp") in D2 and D3 (as opposed to being informed by devices D2 and D3 that power has been removed as in U.S. Pat. No. 7,613,124 to Caveney) and fails. The controller 42 then knows that device D1 is closer to the controller 42 along the bus than devices D2 and D3.

The controller 42 then opens switch D3 and attempts to communicate with devices D1 and D2 and succeeds. The controller then knows that devices D1 and D2 are closer to the controller 42 along the bus than device D3. Using this information, the controller can determine the order of the devices D1, D2 and D3 on the bus.

Determining the Order of Devices on a Bus Using Time Measurement

Figure 10:
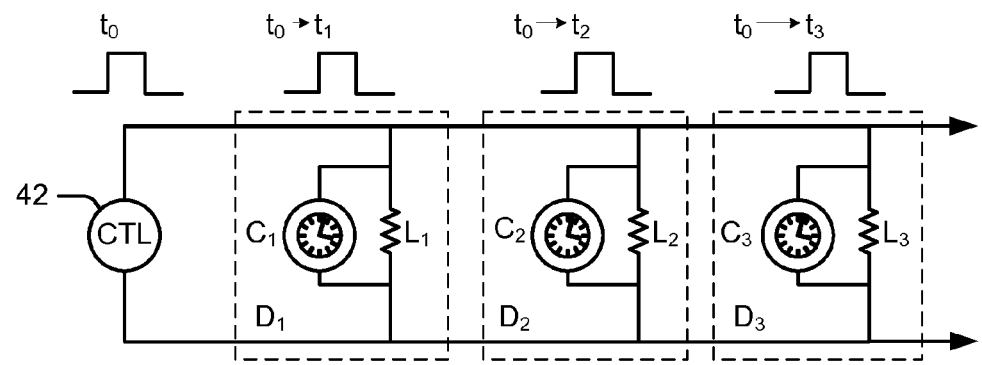

In one embodiment, illustrated in FIG. 10, the BHA consists of three devices, D1, D2, and D3 consisting of three loads L1, L2, and L3, respectively (note that while the loads are shown as resistors they can be any kind of load, including inductive, capacitive, or any combination). In one embodiment, each device also includes a clock or timer C1, C2, C3, respectively, which can measure the time of arrival of a message from a controller CTL. For example, assume that a message or a pulse is generated by the controller 42 at time t0. Device D1 will receive the message at time t1 (t1 being later than t0), device D2 will receive the message at time t2 (t2 being later than t1), and device D3 will receive the message at time t3 (t3 being later than t2) because of the time it takes for the message to propagate along the bus (roughly 1 nanosecond per foot). The timers C1, C2, and C3 are tightly synchronized by messaging between the three devices D1, D2, and D3 so that the fine differences in t1, t2, and t3 can be detected, and so that the method relying on a mathematical computation involving the speed at which data travels along the bus, as described in U.S. Pat. No. 5,247,464 to Curtis, is not needed. By measuring t1, t2, and t3, the order of the devices in the BHA can be ascertained.

Note that in the embodiments described above, it is assumed that the power source (e.g., VS in FIGS. 7 and 8) is located in the controller sub. In one embodiment, the power source is located in another location, such as in a telemetry pulser. In that case, the technique for determining the order of devices on the bus is modified to account for the difference in location of the power source. That is, the techniques set out above, will determine the order of devices relative to the power source. The controller will use that information, the information developed when determining rotation direction, and the information regarding the devices that are on each bus to determine the order of devices on each bus.

Figure 11:
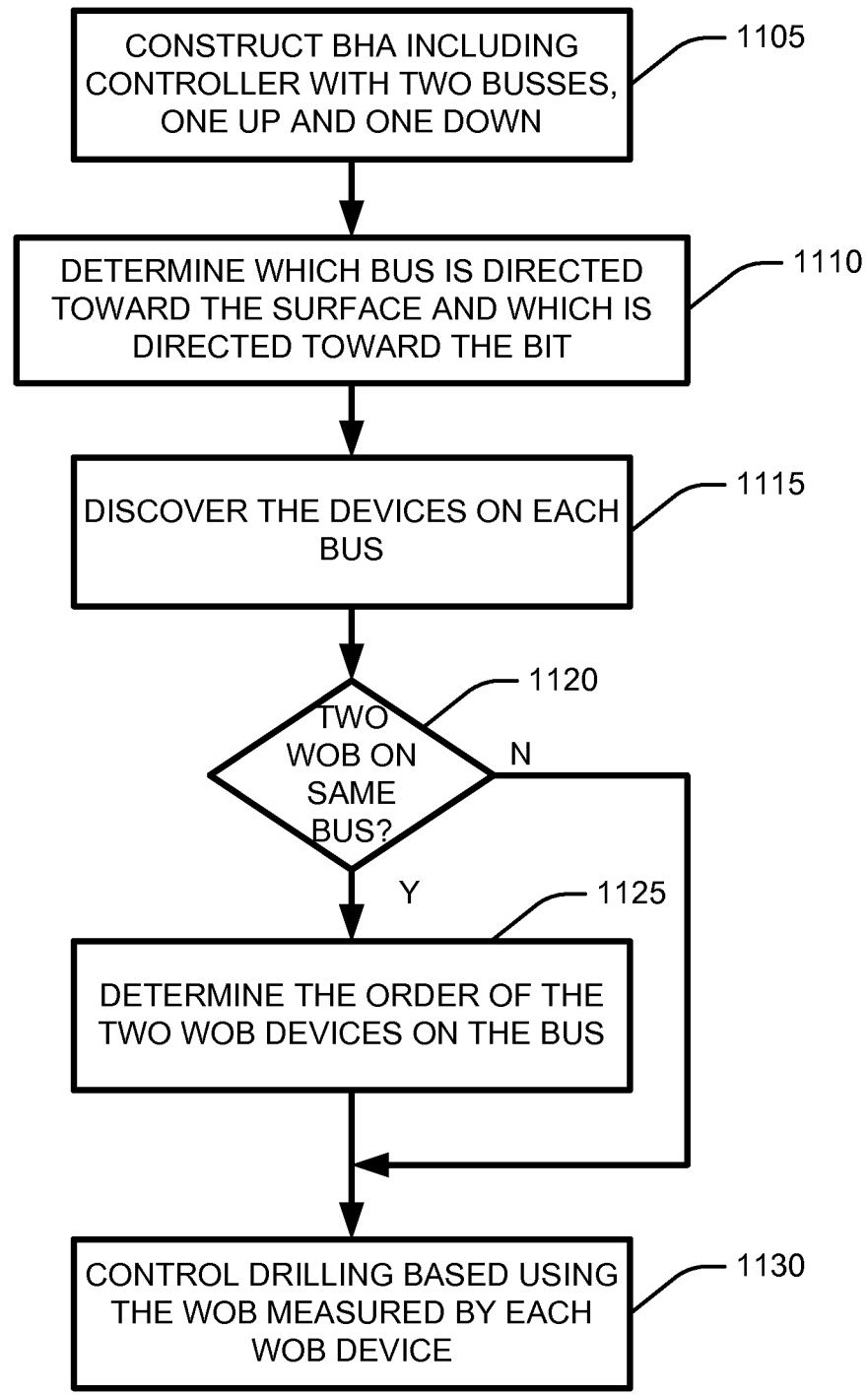
FIG. 11 is a flow chart.

In one embodiment of use, as shown in FIG. 11, a BHA is constructed (block 1105). The BHA includes a controller, e.g., controller 42, with two busses, an upward bus and a downward bus. The technique then determines which bus is directed upward and which is directed downward (block 1110). The technique discovers the devices on each bus (block 1115). If there are two WOB measuring devices on the same bus (block 1120; "Y" branch out of block 1120), the technique determines the order of the two WOB devices on the bus (block 1125). Otherwise ("N" branch out of block 1120), the processing in block 1125 is not necessary (at least for the purpose of determining the order of WOB measuring devices). In either case, drilling is controlled using the WOB measured by each WOB device (block 1130). It will be recognized that similar techniques can be used to discover the order of other types of devices in a BHA.

Note that while the descriptions above have been directed to determining the order of WOB devices on a bus, the technique is general and can be used to determine the order of other types of devices on a bus.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
assembling a string of subs, the string of subs comprising:
a controller sub, comprising:
a first end;
a second end;
a controller;
a first controller bus coupled to the controller of the controller sub, the first controller bus exiting at the first end of the controller sub; and
a second controller bus coupled to the controller of the controller sub, the second controller bus being separate from the first controller bus, the second controller bus exiting at the second end of the controller sub;
a first measuring sub; and
a second measuring sub;
discovering using the controller of the controller sub that the first measuring sub is connected to the first controller bus;
discovering using the controller of the controller sub that the second measuring sub is connected to the first controller bus;
determining that the first measuring sub is physically closer to the controller sub than the second measuring sub; and using the determination that the first measuring sub is physically closer to the controller sub than the second measuring sub in controlling an operation of the string of subs, wherein said determining that the first measuring sub is physically closer to the controller sub than the second measuring sub comprises:

imposing a voltage on the first controller bus by the controller sub while leaving the first controller bus in an open loop configuration, measuring a first voltage across the first controller bus at the first measuring sub, measuring a second voltage across the first controller bus at the second measuring sub, and determining that the first voltage is greater than the second voltage by directly comparing the first voltage to the second voltage.

2. The method of claim 1 further comprising:

attaching the string of subs at an attachment to a subsurface exploration device selected from a group of subsurface exploration devices consisting of a drill string, a wired drillpipe, a coiled tubing, and a wireline;

determining which end of the controller sub is closer to the attachment; and using the determination of which end of the controller sub is closer to the attachment to determine which of the first measuring sub and the second measuring sub is closer to the attachment.

3. The method of claim 2 wherein said determining which end of the controller sub is closer to the attachment comprises:

rotating the string of subs in a known direction from a surface location;

detecting a direction of rotation of the controller sub; and said determining which end of the controller sub is closer to the attachment from the known direction of rotation of the string of subs and the direction of rotation of the controller sub.

4. The method of claim 2 wherein said determining which end of the controller sub is closer to the attachment comprises:

discovering using the controller of the controller sub that a first device for communicating with surface equipment is attached to the first controller bus; and, in response:

determining that the first end of the controller sub is closer to the attachment.

5. The method of claim 1 wherein said determining that the first measuring sub is physically closer to the controller sub than the second measuring sub further comprises:

sending a current down the first controller bus by the controller sub toward the first measuring sub and the second measuring sub;

measuring a first current flowing in the first controller bus at a first point where the first measuring sub connects to the first controller bus;

measuring a second current flowing in the first controller bus at a second point where the second measuring sub connects to the first controller bus;

determining that the first current is greater than the second current and, in response, making the determination that the first measuring sub is physically closer to the controller sub than the second measuring sub.

6. The method of claim 1 wherein said determining that the first measuring sub is physically closer to the controller sub than the second measuring sub further comprises:

opening a switch in the first controller bus to disconnect devices that are further away from the controller sub than the first measuring sub from the first controller bus;

attempting and failing to contact the second measuring sub via the first controller bus and, in response:

making the determination that the first measuring sub is physically closer to the controller sub than the second measuring sub.

7. The method of claim 1 wherein said determining that the first measuring sub is physically closer to the controller sub than the second measuring sub further comprises:

sending a signal from the controller sub down the first controller bus;

detecting the signal at the first measuring sub before the signal is detected at the second measuring sub; and, in response:

making the determination that the first measuring sub is physically closer to the controller sub than the second measuring sub.

8. The method of claim 1 wherein:

the first measuring sub comprises a first weight-on-bit measuring device; and the second measuring sub comprises a second weight-on-bit measuring device.

9. The method of claim 1 wherein:

the first measuring sub comprises a first reamer with a first measuring device for measuring a weight on the first reamer;

the second measuring sub comprises a second reamer with a second measuring device for measuring the weight on the second reamer;

and wherein using the determination that the first measuring sub is physically closer to the controller sub than the second measuring sub in controlling the operation of the string of subs comprises:

using the weight on the first reamer and the weight on the second reamer to make decisions regarding a drilling process.

10. An apparatus comprising:

a string of subs comprising:

a controller sub, comprising:

a first end;

a second end;

a controller;

a first controller bus coupled to the controller of the controller sub, the first controller bus exiting at the first end of the controller sub; and a second controller bus coupled to the controller of the controller sub, the second controller bus being separate from the first controller bus, the second controller bus exiting at the second end of the controller sub;

a first measuring sub; and a second measuring sub;

a computer, said computer programmed to perform a process, wherein the process comprising:

discover that the first measuring sub is connected to the first controller bus;

discover that the second measuring sub is connected to the first controller bus;

determine that the first measuring sub is physically closer to the controller sub than the second measuring sub; and use the determination that the first measuring sub is physically closer to the controller sub than the second measuring sub in controlling an operation of the string of subs, wherein said to determine that the first measuring sub is physically closer to the controller sub than the second measuring sub comprises:
    imposing a voltage on the first controller bus by the controller sub while leaving the first controller bus in an open loop configuration,
    measuring a first voltage across the first controller bus at the first measuring sub,
    measuring a second voltage across the first controller bus at the second measuring sub; and
    determining that the first voltage is greater than the second voltage by directly comparing the first voltage to the second voltage.

11. The apparatus of claim 10 wherein:
the computer is one of a group of computers consisting of a microprocessor in the controller, the microprocessor in the controller sub, a surface computer coupled to the controller, and a remote real time operating center coupled to the surface computer through a network.

12. The apparatus of claim 10 further comprising:
a subsurface exploration device, selected from a group of subsurface exploration devices consisting of a drill string, a wired drillpipe, a coiled tubing, and a wireline, coupled to the string of subs at an attachment;
the process further comprising:
    determining which end of the controller sub is closer to the attachment; and
    using the determination of which end of the controller sub is closer to the attachment to determine which of the first measuring sub and the second measuring sub is closer to the attachment.

13. The apparatus of claim 12 wherein, when said determining which end of the controller sub is closer to the attachment comprises:
    rotating the string of subs in a known direction from a surface location;
    detecting a direction of rotation of the controller sub; and
    said determining which end of the controller sub is closer to the attachment from the known direction of rotation of the string of subs and the direction of rotation of the controller sub.

14. The apparatus of claim 12 wherein, when said determining which end of the controller sub is closer to the attachment comprises:
    discovering using the controller of the controller sub that a first device for communicating with surface equipment is attached to the first controller bus; and, in response:
    determining that the first end of the controller sub is closer to the attachment.

15. The apparatus of claim 10 wherein said determining that the first measuring sub is physically closer to the controller sub than the second measuring sub further comprises:
    sending a current down the first controller bus by the controller sub toward the first measuring sub and the second measuring sub;
    measuring a first current flowing in the first controller bus at a first point where the first measuring sub connects to the first controller bus;
    measuring a second current flowing in the first controller bus at a second point where the second measuring sub connects to the first controller bus;
    determining that the first current is greater than the second current and, in response, making the determination that the first measuring sub is physically closer to the controller sub than the second measuring sub.

16. The apparatus of claim 10 wherein, when said determining that the first measuring sub is physically closer to the controller sub than the second measuring sub further comprises:
    opening a switch in the first controller bus to disconnect devices that are further away from the controller sub than the first measuring sub from the first controller bus;
    attempting and failing to contact the second measuring sub via the first controller bus; and, in response:
    making the determination that the first measuring sub is physically closer to the controller sub than the second measuring sub.

17. The apparatus of claim 10 wherein, said determining that the first measuring sub is physically closer to the controller sub than the second measuring sub further comprises:
    sending a signal from the controller sub down the first controller bus;
    detecting the signal at the first measuring sub before the signal is detected at the second measuring sub; and, in response:
    making the determination that the first measuring sub is physically closer to the controller sub than the second measuring sub.

18. The apparatus of claim 10 wherein:
the first measuring sub comprises a first weight-on-bit measuring device; and
the second measuring sub comprises a second weight-on-bit measuring device.

19. The apparatus of claim 10 wherein:
the first measuring sub comprises a first reamer with a first measuring device for measuring a weight on the first reamer;
    the second measuring sub comprises a second reamer with a second measuring device for measuring the weight on the second reamer;
and wherein, when using the determination that the first measuring sub is physically closer to the controller sub than the second measuring sub in controlling the operation of the string of subs, the process further comprising:
    using the weight on the first reamer and the weight on the second reamer to make decisions regarding a drilling process.

20. An apparatus comprising:
a string of subs comprising:
    a controller sub, comprising:
        a first end;
        a second end;
        a controller;
        a first controller bus coupled to the controller of the controller sub, the first controller bus exiting at the first end of the controller sub; and
        a second controller bus coupled to the controller of the controller sub, the second controller bus being separate from the first controller bus, the second controller bus exiting at the second end of the controller sub;
    a first measuring sub;
    a second measuring sub;
    a first reamer sub comprising a first weight-on-bit measuring device; and
    a second reamer sub comprising a second weight-on-bit measuring device;
the controller of the controller sub programmed to perform a process, wherein the process comprising to:
    discover that the first reamer sub is connected to the first controller bus;

discover that the second reamer sub is connected to the first controller bus;

determine that the first reamer sub is physically closer to the controller sub than the second reamer sub;

determine the first measuring sub is physically closer to the controller sub than the second measuring sub; and use the determination that the first measuring sub is physically closer to the controller sub than the second measuring sub in controlling drilling operations using the string of subs, wherein said to determine the first measuring sub is physically closer to the controller sub than the second measuring sub comprising:

imposing a voltage on the first controller bus by the controller sub while leaving the first controller bus in an open loop configuration, measuring a first voltage across the first controller bus at the first measuring sub, and measuring a second voltage across the first controller bus at the second measuring sub;

determining that the first voltage is greater than the second voltage by directly comparing the first voltage to the second voltage.

21. The apparatus of claim 20, the process further comprising:

attaching the string of subs at an attachment to a subsurface exploration device selected from a group of subsurface exploration devices consisting of a drill string, a wired drillpipe, a coiled tubing, and a wireline;

determining which end of the controller sub is closer to the attachment by:

rotating the string of subs in a known direction from a surface location;

detecting a direction of rotation of the controller sub; and said determining which end of the controller sub is closer to the attachment from the known direction of rotation of the string of subs and the direction of rotation of the controller sub.

22. A computer program, stored in a non-transitory computer-readable tangible medium, the computer program comprising executable instructions that cause a computer to:

discover that a first measuring sub, which is part of a string of subs including a controller sub and a second measuring sub, is connected to a first controller bus originating in the controller sub;

discover that the second measuring sub is connected to the first controller bus;

determine that the first measuring sub is physically closer to the controller sub than the second measuring sub; and use the determination that the first measuring sub is physically closer to the controller sub than the second measuring sub in controlling an operation of the string of subs, wherein said to determine that the first measuring sub is physically closer to the controller sub than the second measuring sub comprises:

imposing a voltage on the first controller bus by the controller sub while leaving the first controller bus in an open loop configuration, measuring a first voltage across the first controller bus at the first measuring sub, measuring a second voltage across the first controller bus at the second measuring sub, and determining that the first voltage is greater than the second voltage by directly comparing the first voltage to the second voltage.

23. The computer program of claim 22, wherein the string of subs is attached at an attachment to a subsurface exploration device selected from a group of subsurface exploration devices consisting of a drill string, a wired drillpipe, a coiled tubing, and a wireline; and the computer program further comprising executable instructions that cause the computer to:

determine which end of the controller sub is closer to the attachment by:

rotating the string of subs in a known direction from a surface location;

detecting a direction of rotation of the controller sub; and said determining which end of the controller sub is closer to the attachment from the known direction of rotation of the string of subs and the direction of rotation of the controller sub.

* * * * *